July 22, 1930.  W. STEVENS  1,771,065
CONFECTION SHELL FORMING MACHINE
Filed July 25, 1927   6 Sheets-Sheet 4

INVENTOR.
William Stevens
BY
Bert Russell
ATTORNEY.

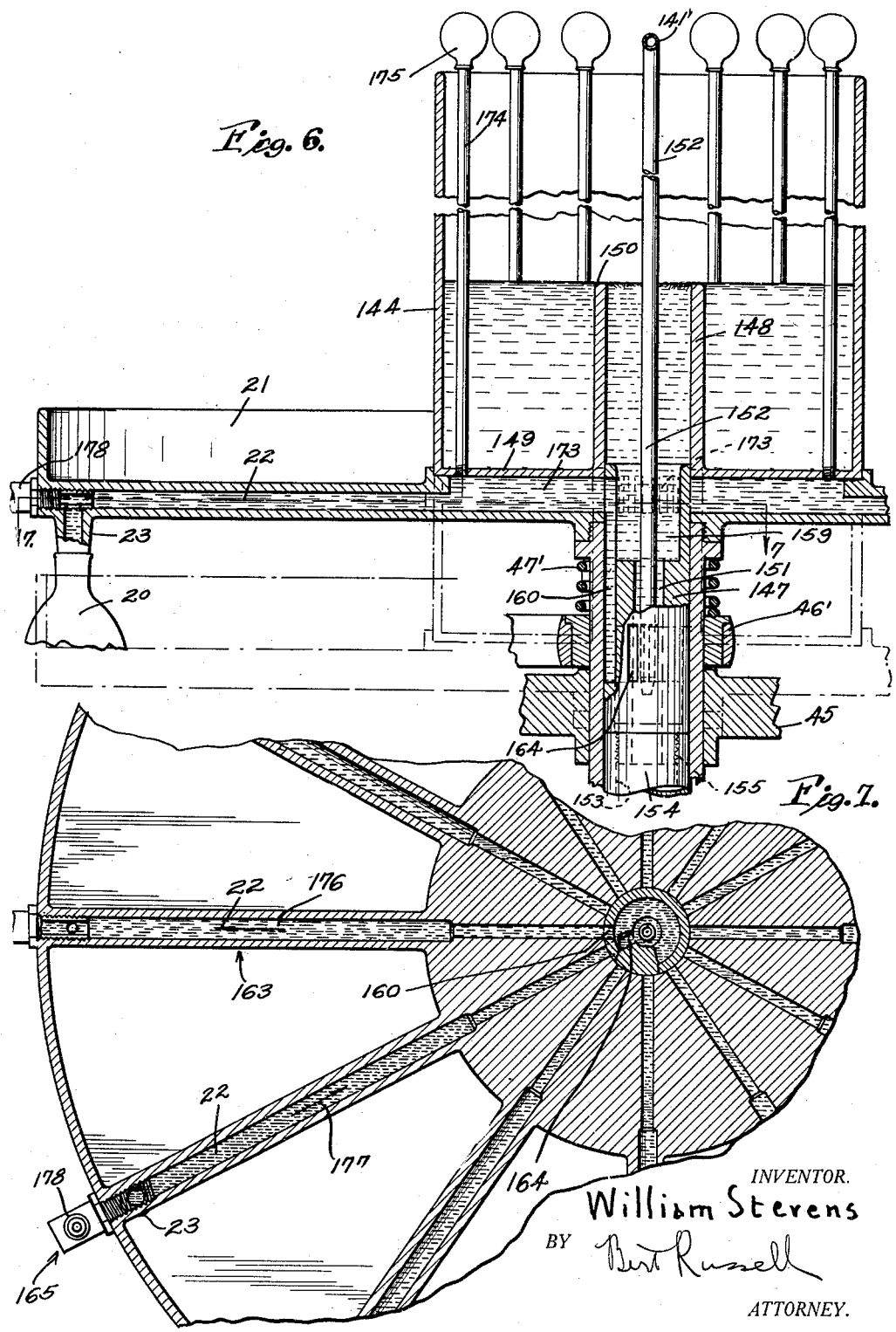

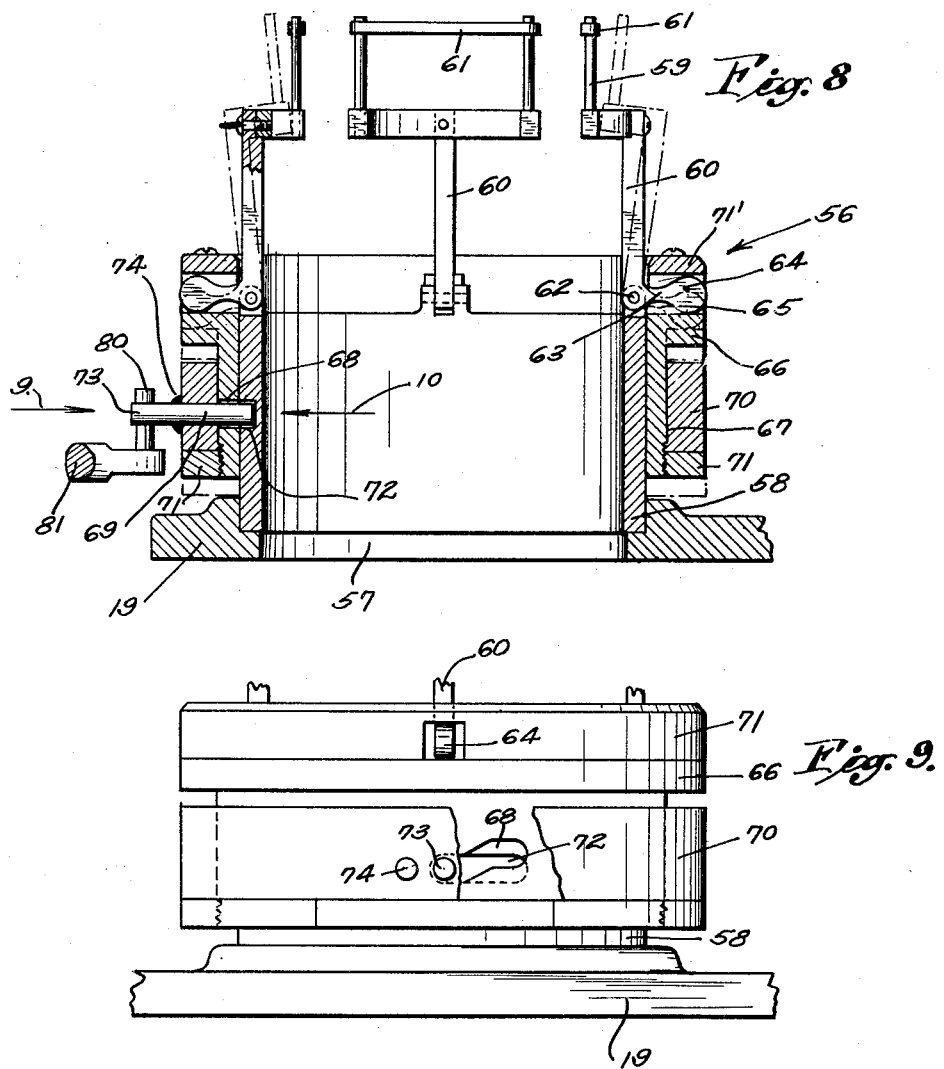

Patented July 22, 1930

1,771,065

UNITED STATES PATENT OFFICE

WILLIAM STEVENS, OF LOS ANGELES, CALIFORNIA, ASSIGNOR, BY MESNE ASSIGNMENTS, TO JACK HIBBARD, OF DETROIT, MICHIGAN

CONFECTION SHELL-FORMING MACHINE

Application filed July 25, 1927. Serial No. 208,388.

Although the principles of my present invention are applicable in the forming of various hollow objects from a material which hardens upon cooling, it is a special object of this invention to provide simple and reliable means for the quantity production of egg-shaped units, suitable to be filled with ice cream, or the like, and to be sold under the "Polar Egg" trademark.

Broadly, it is an object of this invention to coat collapsible molds with shell-forming composition, and to remove said molds. To this end I aim to provide means for the retention and conditioning of a suitable shell-forming composition (preferably substantially anhydrous) and to provide, thereabove, a suitable carrier for collapsible form elements such as rubber bags,—the mentioned carrier being preferably provided with means effective not only vertically to reciprocate the same, at suitable intervals, to dip and to withdraw said bags, but also with means to rotate said carrier, between reciprocations; and, in preferred embodiments of my invention, the hardening of shells upon the mentioned form elements, and the collapse and expansion of said form elements may be effected by the automatic introduction and withdrawal of a suitable bag-filling or inflating fluid, such as a chilled brine.

Other objects of my invention, including the provision of a suitable circulating means and cooling means for the mentioned inflating and cooling fluid, and the provision of means for removing and handling the shells as successively formed (said handling means being preferably such as to hold the shells upright suitably for the filling and sealing of the same) may be best appreciated from the following description of an illustrative embodiment thereof, taken in connection with the appended claims and the accompanying drawings, in which:

Figure 1 may be referred to as a front elevational view, with auxiliary and optional parts diagrammatically shown, taken from the general direction indicated by arrow 1 of Fig. 2, the parts being broken away to different planes. The mentioned planes include the axis of rotation of a screw in a constant-level conditioning device and also the axis of rotation of a mold bag carrier hereafter described,—substantially as suggested by the broken line 1—1 of Fig. 2.

Fig. 6 is a vertical section, on a slightly enlarged scale, taken substantially in the plane indicated by the line 6—6 of Fig. 2, and showing the relationship of parts which govern the filling and voiding of mold bags serving as forms.

Fig. 7 is a horizontal section, taken substantially as indicated by the line 7—7 of Fig. 6, with parts broken away.

Fig. 8 is an enlarged vertical section through a preferred type of shell-gripping and holding unit comprised in the mentioned handling means.

Figure 1:
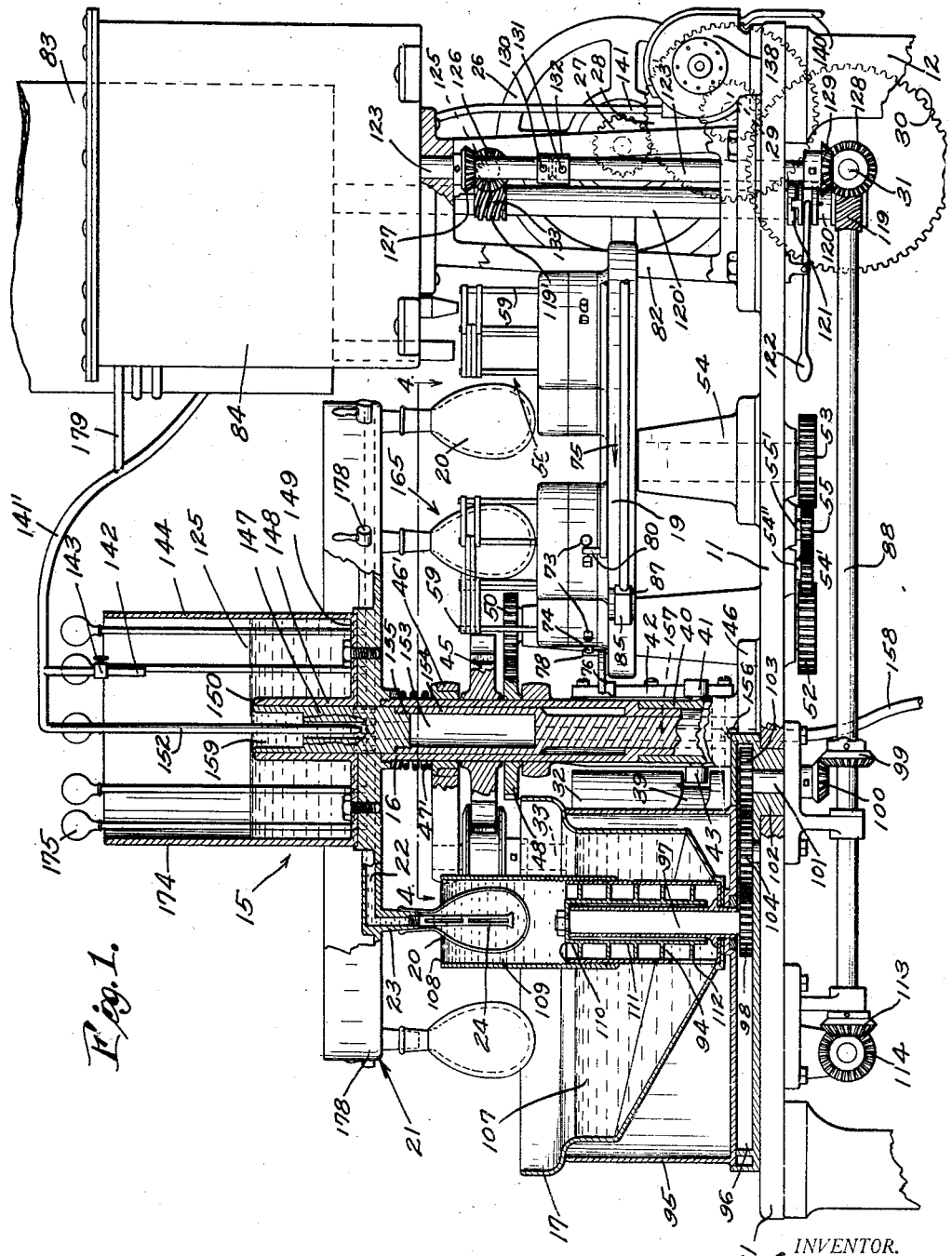

Figs. 9 and 10 are respectively additional detail views, taken substantially as indicated by the arrows 9 and 10 of Fig. 8.

Referring to the details of that specific embodiment of my invention chosen for purposes of illustration, I show in Figs. 1, 2 and 5 a main supporting table 11, so carried by legs 12 as to support the same above a housing or frame 13 (within which any suitable refrigerating apparatus or system 14 may be confined) the level of the table 11 being preferably such as to bring the operating parts hereinafter referred to within convenient reach of an attendant.

On this table I show a bag-carrier 15 as reciprocable and rotatable by means comprising an outer hollow shaft 16; and I show dipping tanks 17 and 18 (and also a handling organization comprising an intermittently rotative table 19) as disposed in an arc partially below said carrier.

Although the mentioned carrier may be of any desired alternative type so long as it provides means for the suitable support, elevation, depression, filling, emptying, rotative advance and thermal-control of a plurality of bags 20, or equivalent collapsible form elements, I show the hollow shaft 16 as directly supporting a main head 21, provided with radial channels or ducts 22 respectively terminating in or communicating with bag-carrying nipples 23,—each nipple being optionally equipped with a laterally apertured or other "quill" 24 adapted to extend into a rubber bag, or the like; and I may employ mechanical means of any preferred character for vertically reciprocating and intermittently rotating the head 21 by means such as shaft 16,—preferably providing, within the latter, means for controlling the admission and withdrawal of chilled brine, or another thermal liquid delivered into a central and elevated tank by any suitable means.

Figure 2:
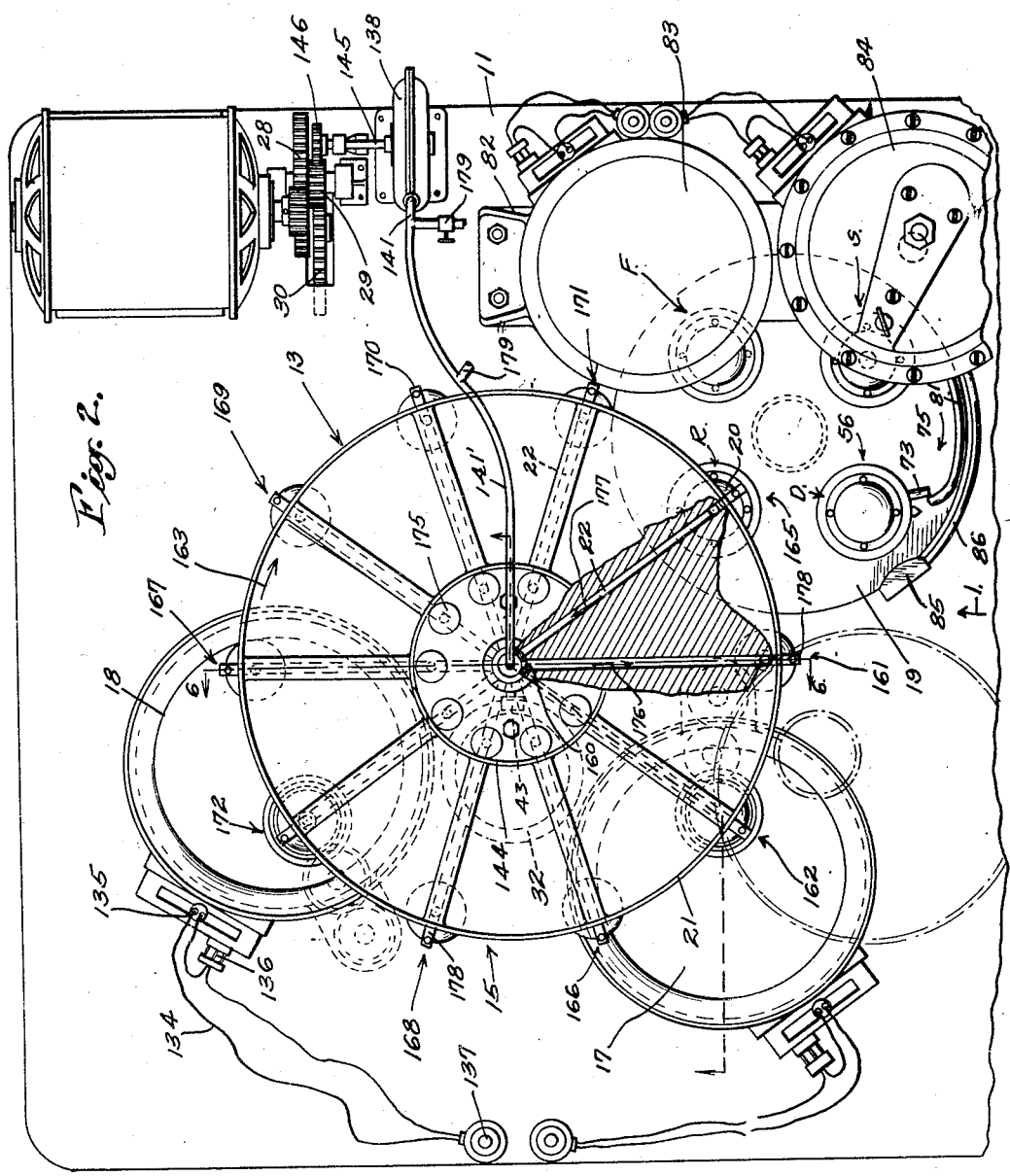
Fig. 2 is a top plan view on a slightly reduced scale, with parts broken away.
Figure 3:
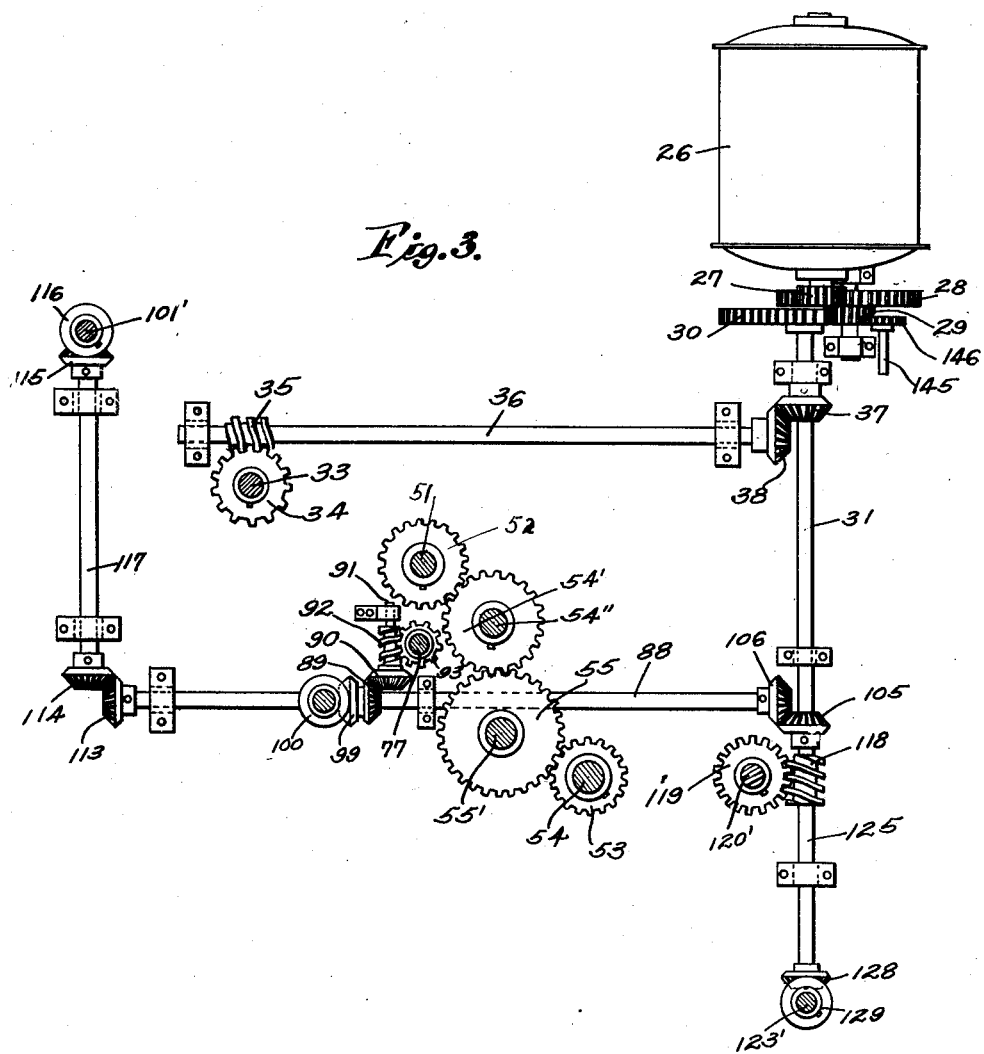
Fig. 3 is a purely diagrammatic view showing various features of one system of gearing and shafting suitable to be positioned below a main support table and to be used in synchronously driving the moving parts of my shell-forming machine, with optional connections which pertain to the operation of a filling unit and a sealing unit diagrammatically shown at the right of Figs. 1 and 2.

As best shown in diagram Fig. 3, taken in connection with Figs. 1 and 2, an electric motor 26, or another suitable source of power, may be employed to impart constant rotation, as by means comprising a train of gears 27, 28, 29 and 30, to a substantially horizontal shaft 31, beneath the main table 11; and a cam drum 32, on a substantially vertical shaft 33 may be driven from the shaft 31 by means such as worm-gear 34 engaged by a worm 35 on a shaft 36,—the shafts 31 and 36 being respectively provided with cooperating bevel gears 37, 38.

Figures 4, 5:
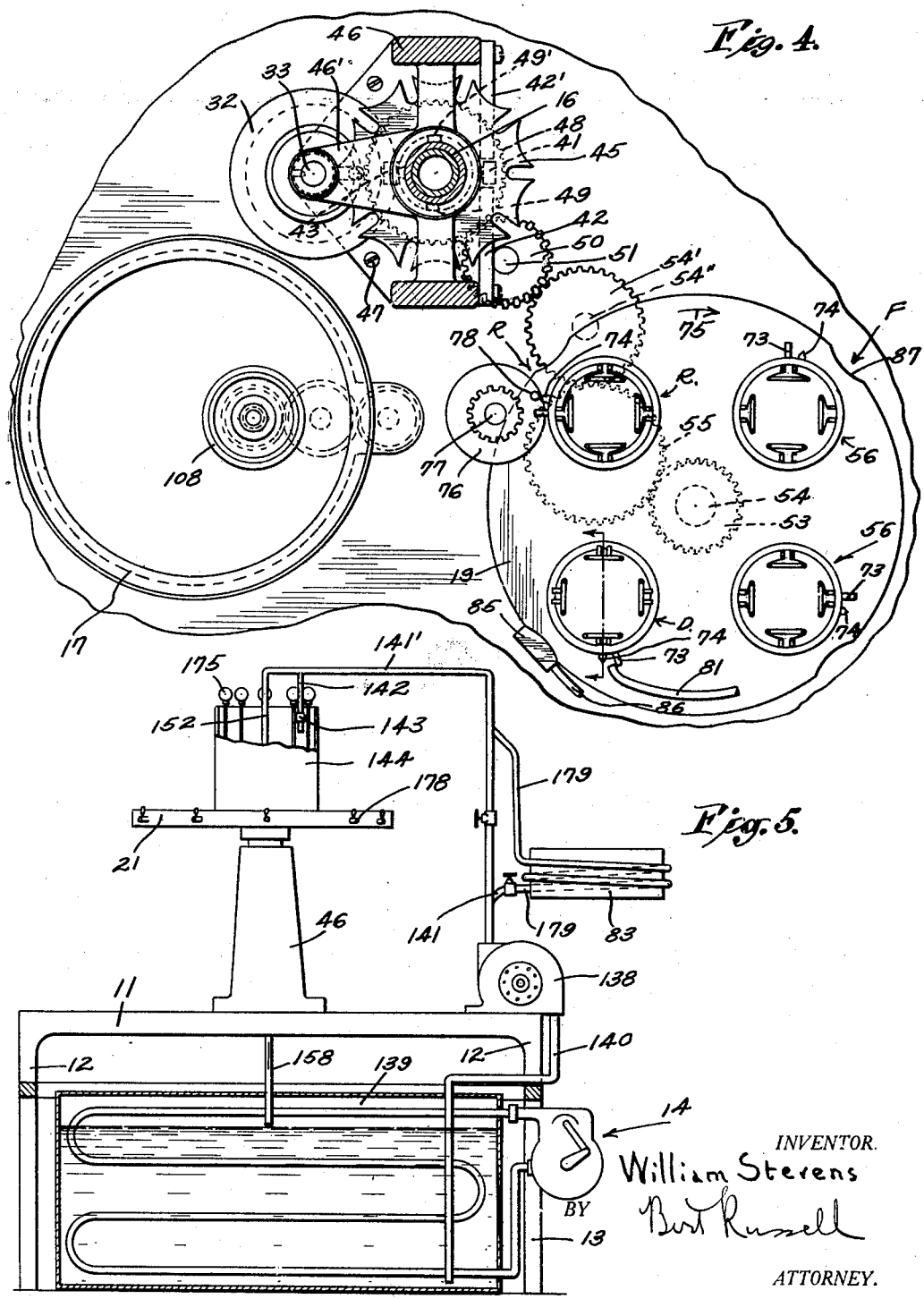
Fig. 4 is a partial horizontal section, taken substantially as indicated by the line 4—4 of Fig. 1, and showing more particularly certain preferred details of an intermittent drive for my mold-bag carrier and shell-handling mechanisms.
Fig. 5 is a diagrammatic elevational view, with parts in section, showing features of a preferred system for the circulation of a cooling liquid to and from the mentioned mold bags and optional additional parts.

The drum 32 being provided with a suitable cam slot 39, and hollow shaft 16 being supported by a suitable cylindrical bearing element 40 (which may be held against rotation by means such as the engagement of a roller 41 between vertical guides 42, 42', as best shown in Figs. 1 and 4) engagement of an additional roller 43 within said slot may be relied upon to effect a suitable vertical reciprocation of the head 21 during intervals between intermittent rotative movements thereof; and the desired rotative movement may be effected by means such as a gear train, of Geneva type, comprising a pin 44, eccentrically carried by the drum-carrying shaft 33 and adapted to engage and intermittently to rotate a slotted gear element 45,—splined or similarly secured to the hollow shaft 16.

The shafts 33 and 16 may be held in their intended relationships by means comprising a floating bearing plate 46' and a main bearing 46, the latter being shown as held in place by screws or bolts 47 extending into the table 11; a compression spring 47' may be interposed above plate 46'; and a suitable intermittent movement, consistent with the rotative advance of the head 21 (which is intended to occur during intervals when it is elevated by the described cam means) may be imparted to a handling organization comprising the rotating table 19, by means such as an additional gear train driven from a main horizontal gear 48,—with which the hollow shaft 16 may have a splined connection, as best indicated at 49, 49', Fig. 4. The gear 48 is shown as engaging a complemental gear 50 upon the upper end of a vertical shaft 51, which may extend downward through the table 11, there carrying a gear 52; and motion may be transmitted from the latter to a gear 53, on a shaft 54 carrying the rotating table 19, by means such as suitable idlers 54' and 55, shown as carried by stub shafts 54'', 55'.

It will be understood that although I show but two dipping tanks 17 and 18, any desired number of such tanks may be employed, provided the same are suitably disposed with reference to intervals between the nipples 23, carrying bags 20; and it will also be understood that although I show the head 21 as provided with ten such nipples, a greater or lesser number thereof may be employed; but, in any case, the described reciprocatory and rotative movement are intended to be such that one of the bags 20 shall be dipped in the tank 17, or its equivalent, at each reciprocation of said head, and such that a confection-shell, or other hollow product, shall be removed from another bag or other collapsible form element incidentally to each lowering of said head.

For the purpose last referred to I provide the rotating table 19 with a suitable number of shell-gripping units 56 (see especially Figs. 8, 9 and 10) four such units being shown as positioned above corresponding openings 57 in the rotating table 19. Each of the mentioned shell-gripping units 56 may comprise a fixed hollow cylinder 58 provided with a set of shell-receiving fingers 59,—the latter being shown as carried in pairs by levers 60 and as provided with shell-engaging elements in the form of rubber bands 61; and radial movement may be imparted to the levers 60, to cause said fingers or bands to engage a shell, by means of any preferred character. For example, the levers 60, shown as pivoted at 62, may be provided with outwardly extending arms 63, terminating in rounded ends 64, receiving within radial slots 65 in a vertically movable collar 66; and a downwardly extending portion 67 of this collar may be provided with a cam slot 68 suitable for the reception of a pin 69. This pin may be rigidly secured within an operating collar 70, rotatable within a suitable channel provided in the collar 66 (which may comprise a removable section 71) and the pin 69 may be so related to the mentioned slot 68 and to a cooperating but differently formed slot 72, provided in the fixed cylinder 58, that a slight rotative movement of the operating collar 70 (as may be effected by engagement of a projecting end 73 of the pin 69 or by engagement of an additional and shorter projecting element 74 with any suitable operating element) imparts a shell-gripping or shell-releasing movement to the fingers 59.

Thus, assuming the table 19 to be intermittently rotated in the direction of the arrows 75, means such as a movable operating member 76 (shown as carried by a constantly rotated vertical shaft 77 and as comprising an upstanding pin 78) may serve to close the fingers for engagement of a suitably hardened shell 79,—said fingers serving for the support of said shell during its travel between a receiving station R and a delivery station D.

The respective shells so held may be with any suitable mechanism filled with ice cream, or the like, at a filling station F, and filled shells may, if desired, be thereafter sealed at a sealing station S; but, in any event, incidental to their arrival at a delivery station D, engagement of the respective pins 69 with finger-opening means such as an upstanding stop or pin 80 (which may be resiliently supported upon an arm 81, extending laterally from a subsidiary frame 82 for the support of a filling organization conventionally shown at 83 and/or a sealing organization conventionally shown at 84) the fingers 59 may be so separated as to permit the respective shells successively to drop through the mentioned openings 57 and into the hand of an operative (or into a suitable conveyor, not shown)—sheets of a suitable wrapping material being optionally held beneath the openings 57 either by the hand of the operative or by any suitable means not shown.

Any suitable means (such as a resiliently supported dog 85 mounted upon the end of a rod 86 and adapted to enter notches 87 in the periphery of the table 19) may be employed to steady said table during the operations referred to; and if desired the mentioned shaft 77, serving to rotate the finger-closing pins 78, may be continuously driven from a horizontal shaft 88, disposed beneath the table 11 and serving not only to rotate a worm gear 93 on the vertical shaft 77 (through bevel gears 89 and 90, the latter being shown as secured on a shaft 91, carrying a worm 92) but also to rotate a spiral circulating element or screw 94 within each of the dipping tanks 17 and 18; and, although I may employ dipping tanks of any desired alternative type, I will next describe my preferred type of dipping tank and my preferred means for establishing and maintaining a desired temperature, a desired circulation, and a desired level within interior parts thereof.

As best shown in Fig. 1, each dipping tank may be surrounded by a thermal jacket 95 shown as supported by a gear housing 96,—said tank and said jacket being provided with aligned openings for a screw-carrying vertical shaft 97, shown as rotatable by a gear 98; and this gear may be driven from the shaft 98 by means such as a pair of bevel gears 99 and 100,—the latter being shown as carried by a short vertical shaft 101 which extends through a bearing element 102 and carries an upper gear 103, an idler 104 being interposed between gears 103 and 98 and the bearing element 102 being preferably integral with the gear housing 96 and adapted to serve as a pivot therefor.

By the construction last referred to, the shaft 88 being preferably driven from the shaft 31 by means of a pair of bevel gears 105 and 106, the screw 94, or its equivalent, may be continuously rotated regardless of any movement of the tank 17 about the axis of the shaft 101, concentric with a bearing element 102; and, in order to assure a uniform depth of immersion of each rubber bag 20, or its equivalent, I prefer to employ the screws 94 not only to agitate the shell-forming composition 107 but to produce a constant overflow thereof above the top edge 108 of an inner receptacular element 109,—the latter being shown as having a sufficient diameter to permit the immersion of successive collapsible form elements therein and as adjustable by means of a threaded engagement at 110 with a fixed cylindrical element 111 having an inlet opening at 112 and approximately corresponding in internal diameter to the external diameter of the screw 94.

It will be understood that a shaft 101', Fig. 3, may serve to drive a screw 94 within the tank 18; and that this shaft 101' may be driven from the shaft 88 by means such as additional bevel gears 113, 114, 115 and 116,—the gears 114, 115 being shown as secured upon a shaft 117; but Fig. 3 is so entirely diagrammatic that no reliance should be placed upon the relative proportions of the shafts and gears shown therein; and the provision of a worm 118 upon a forwardly extending portion of the shaft 131, for the purpose of driving a worm gear 119 upon the lower end of a shaft 120, by which movable parts of the ice cream feeding unit 83 and/or the sealing unit 84 may be driven, should be regarded as optional. In this connection I may suggest that the last-mentioned shaft may comprise an independent upper section 120', means such as a clutch 121, manipulable by a push-rod or overbalanced lever 122 being optionally employed to enable an operative to momentarily discontinue the mentioned driving connection in case a defective shell is produced; and by providing an upper worm 119' on the shaft section 120' I may drive an upper section 123 of a substantially vertical sealer shaft either through a worm gear (not shown) upon an upper horizontal shaft 125 and cooperating bevel gears 126 and 127 or through a similar pair of bevel gears 128—129, Fig. 1, respectively on a forwardly extending portion of the shaft 31 and on a lower shaft section 123',—the latter being coaxial with the mentioned shaft 123 and serving either to provide an end bearing therefor or to rotate the same. Upon the tightening of screws 130 and 131, extending through a coupling sleeve 132, and the withdrawal of a screw 133, shown as serving to secure the worm 119' upon the supper shaft section 120', the sealing organization, if provided, may be driven regardless of an interruption in the operation of the filling organization.

Coming now to my preferred means for a thermal-control system suitable to the casting of confection-shells (details of a preferred composition and process being set forth in my application, S. N. 201,690, filed June 27, 1927), I show each of the jackets 95, around the dipping tanks 17 and 18 (and also the filling organization 83 and sealing organization 84) as provided with thermostatic means for the maintenance of a desired minimum temperature,—switches, for the connection of the same with a current supplied through wires 134, in which a thermal switch 135 and a resistance heater 136 may be interposed, being indicated at 137; but it should be understood not only that the electrical features here referred to as adapted to prevent the temperature from falling below a predetermined point are well known in the art, but that I attach greater importance to the means which I will next describe as suitable to the filling and emptying of the rubber bags 20, or their equivalent, with a suitably cooled brine, or the like.

Referring again to Figs. 1, 2 and 5, I show a pump 138 as adapted upwardly to advance a cooling liquid, hereinafter referred to as a brine, from a lower tank 139, comprised in the mentioned refrigerating system, said pump being provided with an inlet pipe 140 and with an outlet pipe 141, and an upper portion 141' of the latter being provided with a branch pipe 142, valved at 143. The latter is shown as terminating within an upper brine tank 144, supported by and movable with the mentioned bag-carrying head 21.

Assuming the pump 138 to be constantly driven (by means such as a shaft 145 carrying a gear 146, adapted to mesh with the mentioned gear 29) and referring now more particularly to the showing in Figs. 1, 6 and 7, the head 21 and upper tank 144 being shown in full lines in Fig. 6 as elevated and shown in Fig. 1 as in a lowered position relatively to a fixed cylindrical element 147, snugly fitting within a cylindrical overflow element 148 (which may be integral with a bottom element 149 of the upper tank 144) it should be understood that a stream delivered through the branch pipe 142, or its equivalent, is intended to be sufficient to cause a continuous overflow above an upper edge 150 of the cylindrical element 148; and to assure descent of the overflowing brine through a central passage 151 in the fixed cylindrical element 147, regardless of the elevation and depression of the tank 144 (incidentally to the described dipping of form elements 20) I may employ means such as an aspirating or ejecting jet of brine constantly and forcibly delivered through a second branch pipe 152.

I show the central passage 151 of inner cylindrical element 147 as communicating with the hollow interior 153 of a fixed post 154 upon which the hollow shaft 16 is adapted to reciprocate and to rotate; the cylindrical element 147 may have a threaded connection with said post at 155; and said post may not only be secured to the mentioned bearing casting 46 by means such as a screw 156, but also provided with an outlet passage 157 with which a brine return pipe 158 may be connected.

In order that the inner cylindrical element 147 which is shown as provided with a well 159, may serve as a valve element controlling the flow of brine to and from the mentioned radial passages 22 in the bag-carrying head 21, I show the said element as provided with a comparatively long bag-filling vertical slot 160 (see Figs. 6 and 7) adapted to establish communication between the mentioned well 159, during a stop of each bag at a bag-filling station 161 (immediately in advance of the first dipping station 162), the length of the slot 160 being such as to permit a continuance of the filling action during vertical reciprocation of the head 121 and up to the time of its advance, in the direction of the arrow 163, between said stations; and I show said cylindrical element as provided also with a brine-withdrawal opening or slot 164, shorter than the mentioned slot 160 and adapted to establish communication with that duct 22 which leads to the bag or other form element 20 which may be positioned, at the moment referred to, at a station 165, immediately above the mentioned shell-receiving station R,—the consequent withdrawal of brine from the bag 20 last referred to being due to a suction effect produced by the continuously-operating ejector 152 and by the weight of the descending column of brine therebelow and being practically simultaneous with the gripping of a shell, in the described manner, by the appropriate set of fingers 59.

It will be seen that the described filling of the forms 20 with a cooling fluid is appropriate to the prompt solidification of a confection-shell thereon (regardless of the method employed to apply the coating fluid thereto); that the suspension of each shell momentarily at stations 166 and 167, above the respective tanks 17 and 18, is favorable to the dripping of any excess material therefrom; that cooling and hardening (by the action of the external air, or by other means) may continue during the stops made at stations 168 and 169; and that either an identical composition or a differently flavored or colored composition may be employed in the second dipping of each shell at the station 172 provided by tank 18, or its equivalent; and that any filling and/or sealing mixtures added may contribute to an artistic general effect.

In conclusion, I may mention that although my preferred shell-forming composition may be such as to give but little or no trouble by reason of expansion and contraction with change in temperature, in order to reduce or entirely to obviate danger of cracking confection-shells during a solidification which may involve some contraction, the inner portions 173 of the mentioned ducts 22 being preferably closed merely by the bottom 149 of the upper tank 144, I find it advantageous to so insert pipes 174 through the mentioned bottom element as to provide separate passages communicating with air-filled bulbs or other pressure-relief compensating elements 175,—so formed and positioned as to allow for a slight contraction of the respective form elements in response to any pressure arising from the solidification of shells thereon; and it will be understood that both the form elements 20 and the compensating bulbs 175 being preferably mere rubber or toy balloon bags, carefully standardized, the downward withdrawal of brine through the valve opening 164 in the inner cylindrical element 147, or its equivalent, is effective to produce a simultaneous partial collapse of a pair of the mentioned bags, one in each set. Directions of simultaneous flow through two of the ducts 22 are indicated by arrows 176 and 177, Figs. 2 and 7; and each of said ducts may be provided with a mere clean-out plug 178 (in preference to an actual valve).

Referring to the mentioned companion application for details of construction pertaining exclusively to my optional filling and sealing organizations 83 and 84, I diagrammatically suggest in Fig. 5 the employment of a valved branch 179 in producing desired cooling effects therein by means of the chilled brine upwardly delivered by pump 138; but the brine or other thermal fluid should reach the form elements 20 at a comparatively low temperature, such as 35° F.,—a temperature of about 100° F. being preferably maintained in the tanks 17 and 18, in case shells are to be formed from a confection such as my preferred mixture comprising about four parts each of cocosine and confectioners sugar to one part of parlac, agitated until rendered fluent and homogeneous; but it should be understood that the principles of my present invention are believed to be applicable to the forming, filling and handling of a great variety of hollow bodies in addition to the shells of "Polar Eggs." When used for the purpose last referred to, one of my machines may turn out filled and/or sealed and/or wrapped "Polar Eggs" at such a rate as 360 per hour.

Although I have herein described a single complete and commercial embodiment of my invention, suggesting various alternative details, it should be understood not only that numerous features of my present invention might be independently employed but also that many modifications, additional to those herein suggested, might easily be devised by workers skilled in the arts to which this case relates,—without involving the slightest departure from the spirit and scope of my invention, as indicated above and set forth in the following claims.

I claim as my invention:

1. In a machine of the general character described: means for confining a shell-forming liquid; a collapsible form; means for mechanically producing a relative movement between said form and said liquid,—externally to coat said form with said liquid for solidification thereon; and means for cooling said form, to effect such solidification.

2. In a machine of the general character described: means for confining a shell-forming liquid; a collapsible form; means for producing a relative movement between said form and said liquid; and means for subsequently collapsing said form,—said moving means comprising a rotatable bag carrier and means for intermittently moving the same.

3. In a machine of the general character described: means for confining a shell-forming liquid; a collapsible form; means for producing a dipping movement between said form and said liquid; and means for subsequently collapsing said form,—said liquid confining means being provided with means for maintaining a predetermined level by a circulation and overflow of said liquid.

4. For use in a machine of the general character described: liquid confining means provided with interior means for maintaining a predetermined level by a circulation and overflow of the said liquid; and driving means for said interior means permitting a horizontal shifting of said confining means without interruption of said circulation.

5. In a machine of the general character described: means for confining a shell-forming liquid; a collapsible form; means for producing a dipping movement between said form and said liquid; and means for subsequently collapsing said form,—a plurality of collapsible forms being carried by a head which is comprised in said dipping means and which is provided with means for the introduction and withdrawal of a cooled liquid to effect a filling and the mentioned collapse of each form in turn.

6. An organization of the general character defined in claim 1 in which said moving means comprises a reciprocable head carrying a plurality of collapsible forms; and in which said head is provided with ducts connectable with a tank for a cooled liquid to said forms; and in which said collapsing means comprises means for the withdrawal of said liquid from said forms through said ducts.

7. An organization of the general character defined in claim 1 in which said moving means comprises a reciprocable head carrying a plurality of collapsible forms; and in which said head is provided with ducts leading from a tank, for a cooling liquid, to said forms; and in which said collapsing means comprises means for the withdrawal of said liquid from said forms,—said ducts being provided with compensating presure-relief means.

8. An organization of the general character defined in claim 1, in which said moving means comprises a form-carrying head, and gearing of Geneva type, to impart rotative intermittent movement to said form-carrying head, and in which means are provided for a vertical reciprocation of said head during intervals between the rotative advances which are produced by said gearing.

9. An organization of the general character defined in claim 1, in which said moving means comprises gearing of Geneva type to impart rotative movement to a form-carrying head, and in which said collapsing means comprises a valve organization whereby a fluid is admitted to one form during the withdrawal of fluid from another form to effect the mentioned collapse thereof.

10. An organization of the general character defined in claim 1, in which means are provided for the mechanical removal of a shell from said form upon the collapse of said form.

11. In a machine of the general character described; means for the forming of hollow shells upon collapsible forms; and means, comprising movable parts, for the engagement and support of said shells, upon the withdrawal of collapsed molds therefrom.

12. An organization of the general character defined in claim 13 in which said last mentioned means comprises a rotatable table provided with a plurality of shell-gripping units disposed above openings therein; and means for intermittently rotating said table.

13. In a machine of the general character described; means for the forming of successive hollow shells upon collapsible forms; and a series of units for the engagement and support of said shells upon the withdrawal of collapsed forms therefrom synchronously with a delivery of successive shells to said units.

14. In a machine of the general character described; means for the forming of hollow shells upon collapsible forms; and a series of units for the engagement and advance of said shells upon the withdrawal of collapsed forms therefrom and synchronously with a delivery of successive shells to said units,—said units each comprising a set of shell-engaging fingers and means for closing and opening the same at different stations.

15. In a machine of the general character described: means for the forming of hollow shells upon collapsible forms; and means for the engagement and advance of said shells upon the withdrawal of collapsed forms therefrom and synchronously with a delivery of successive shells to said units,—said means comprising a table which is intermittently advanced beneath a filling machine.

16. In a machine of the general character described; means for confining a shell-forming liquid; a collapsible form; means for producing an intermittent relative movement between the form and the liquid whereby the form is immersed, then freed from the liquid, and then moved out of line therewith; and means for subsesuently collapsing said form.

17. In a machine of the general character described; an inflatable bag; means for confining a shell forming liquid into which said bag can be dipped; and means for passing a cooled fluid to and from the bag for inflating and deflating it, as well as for cooling it.

18. In a machine of the general character described; a collapsible bag made from a flexible material; means whereby a cooled fluid is passed to and from the bag for inflating and deflating it, as well as for cooling it; and means whereby said bag can be immersed to a predetermined extent in a shell forming liquid.

19. In a machine of the general character described; a movable carrier; one or more inflatable bags supported thereon; means confining a shell forming liquid; means for moving the carrier vertically so that the bag can be lowered into the liquid; means for intermittently moving the carrier laterally away from the liquid; and means automatically brought into operation by the arrival of the bag at a definite point of travel of the carrier, for deflating the bag.

20. The combination as set forth in claim 19, in which the deflating means includes means providing a suction, and means whereby a passageway from the bag to the suction is completed only when the bag reaches a definite position.

21. In a machine of the general character described; an inflatable flexible form over which can be formed a shell; and means for gripping the formed shell, including a series of elastic strips and means for moving said strips toward and from the shell.

In witness whereof, I have hereunto affixed my signature.

WILLIAM STEVENS.